Patented Oct. 10, 1922.

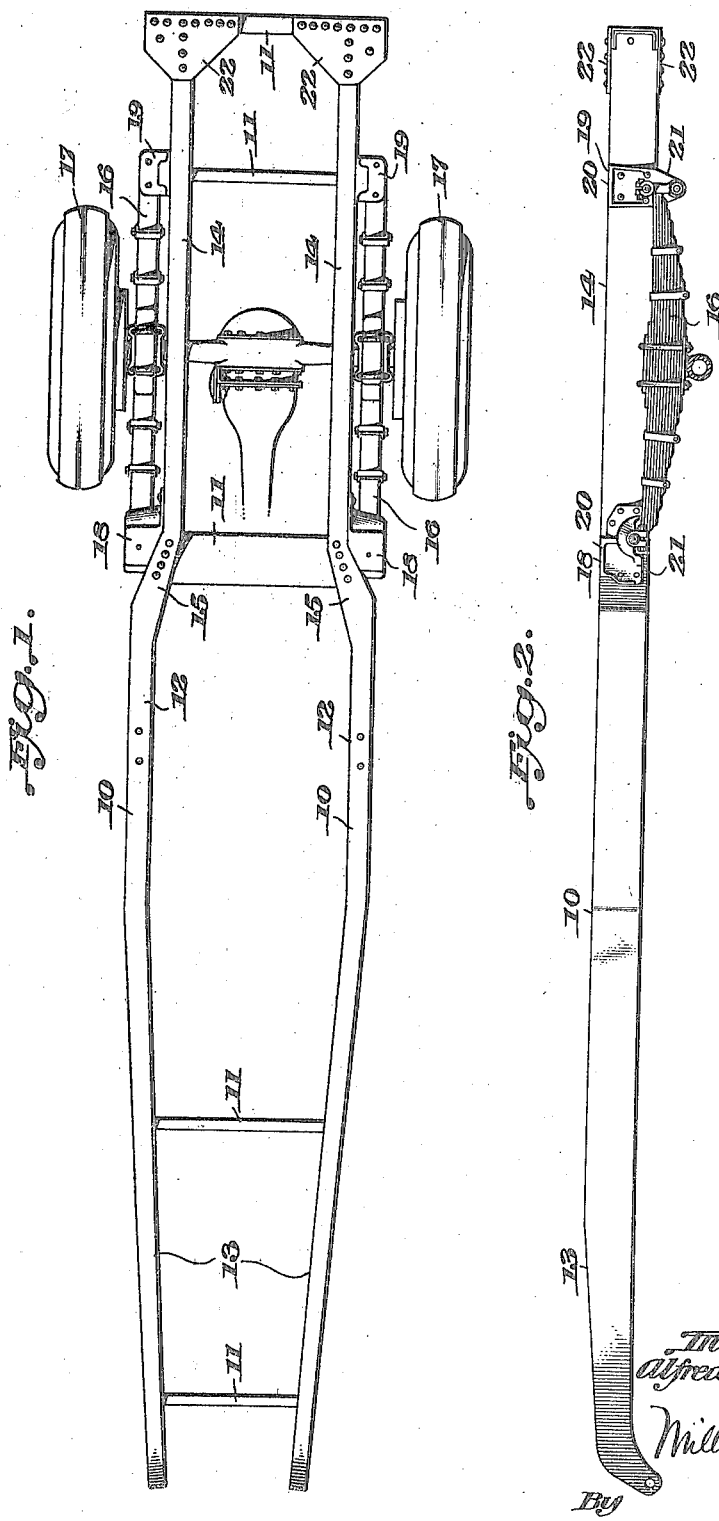

1,431,480

UNITED STATES PATENT OFFICE.

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed August 26, 1920. Serial No. 406,146.

*To all whom it may concern:*

Be it known that I, ALFRED MOORHOUSE, a citizen of the United States, and resident of Detroit, Wayne County, State of Michigan, have invented certain new and useful Improvements in Motor Vehicles, of which the following is a specification.

This invention relates to motor vehicles, and more particularly to vehicle frames.

In designing a frame for motor vehicles, there are several problems presented. The frame must be so designed as to properly support the vehicle body mounted thereon in such a manner as to prevent the body from tipping laterally. The front and rear ends of the frame must also be so constructed and of such dimensions as to permit the front wheels to turn and to give the proper tread to the vehicle. This latter problem is much more difficult of solution with the pneumatic tired commercial vehicle, or truck, due to the great width and size of the tires.

One of the objects of this invention is, therefore, to provide a frame structure which will satisfy the requirements of clearance for the front wheels, tread for both sets of wheels, and support for the superimposed body structure.

Another object of the invention is to provide a motor vehicle frame of such width as to give the desired tread but also having sufficient width to properly support the body.

Further objects will appear from the following specification taken in connection with the drawings, which form a part of this application and in which:

Fig. 1 is a top plan view illustrating a motor vehicle frame constructed in accordance with my invention; and Fig. 2 is a side elevation of the construction shown in Fig. 1.

The motor vehicle frame illustrated in the drawings comprises a pair of longitudinal side members 10 connected together by transverse frame members 11. The frame is widest at its intermediate portion as shown at 12, the front ends of the frame members converging as shown at 13, and the rear ends of the frame members being disposed closer together, as shown at 14, than their intermediate portions. The rear portions of the frame members in the embodiment of the invention illustrated are disposed substantially parallel, these portions being connected to the intermediate portion by inclined angular disposed portions 15.

The rear portion of the frame is reduced in width in order to provide for the mounting of the vehicle springs 16 and the pneumatic tired wheels 17 without increasing the tread of the vehicle, since any increase of the tread over the standard tread, which is substantially 56 inches, is particularly objectionable on country roads.

In view, however, of the reduced width of the rear portion of the frame, means must be provided for properly supporting the body which is superimposed upon the frame, in order to prevent the lateral tipping of the body. For this purpose additional body supporting means has been provided, this means comprising a pair of laterally extending brackets 18, secured to the front ends of the reduced frame portion, and a pair of brackets 19 secured to the portions 14 of the side frame members intermediate at their ends. The brackets 18 and 19 have substantially flat upper surfaces 20 upon which the body is secured, and each of these also has a downwardly extending portion 21 which forms a hanger for the vehicle springs 16. It will thus be seen that each of these brackets performs a dual function; namely, that of supporting the body and forming a spring hanger.

In order to further support the body structure, I have secured to the rear corners of the frame laterally extending plates 22, these plates and the brackets 18 and 19 increasing the effective widths of the rear portion of the frame to substantially the width of the intermediate portion indicated at 12.

From the above description, it will be seen that a vehicle frame has been provided which will satisfy the requirements of clearance for turning, the requirement of width as to tread, and also the requirement of support for the body.

Although one specific embodiment of the invention has been illustrated and described, it will be understood that the invention is capable of modification and that modifications and changes may be made in the construction and in the arrangement of the various parts without departing from the spirit or scope of the invention as expressed in the following claims.

What I claim and desire to secure by Letters Patent is:

1. A frame for motor vehicles comprising longitudinal side members and cross members connecting said side members, the rear ends of said side members being disposed closer together than the intermediate portion thereof, and body supporting means carried by rear ends of said members and extending laterally therefrom.

2. A frame for motor vehicles comprising longitudinal side members and connecting cross members, the rear end of said frame being reduced in width, and body supporting means secured to the reduced rear end of said frame and extending laterally therefrom to an extent sufficient to increase the effective width of the reduced portion of said frame to a width equal to that of the widest portion of said frame.

3. A frame for motor vehicles comprising longitudinal side members and means for connecting said side members, the rear portion of said frame being reduced in width, and brackets secured to the rear portion of said frame and extending laterally therefrom, said brackets having body supporting portions and portions adapted to act as spring hangers.

4. In combination, a frame having longitudinal side members, the rear portions of said side members being disposed closer together than the intermediate portions thereof, laterally extending brackets carried by the rear portions of said side members and having substantially flat body supporting surfaces, and vehicle springs secured to said brackets.

5. A frame for motor vehicles having longitudinal side frame members so connected that the frame is reduced in width at its rear portion, and laterally extending body supporting brackets secured to the reduced portion of said frame.

6. A frame for motor vehicles comprising a pair of longitudinal side frame members having their front ends converging, their intermediate portions substantially parallel to each other, and their rear portions substantially parallel but disposed closer together than their intermediate portions, and body supporting brackets carried by the rear portions of said frame members for increasing the effective width of the body supporting surface of said frame.

7. A frame for motor vehicles comprising a pair of longitudinal side frame members having substantially parallel intermediate portions, substantially parallel rear portions disposed closer together than said intermediate portions, and inclined connecting portions between the intermediate portions and the rear portions, and a plurality of brackets secured to and extending laterally from the rear portions of said frame for increasing the width of the body supporting surface of said rear portions.

In testimony whereof I affix my signature.

ALFRED MOORHOUSE.